(12) United States Patent
Gentry et al.

(10) Patent No.: US 8,029,215 B2
(45) Date of Patent: Oct. 4, 2011

(54) SPIRAL DRILL BIT AND METHOD OF FORMING SAME

(75) Inventors: Charles L. Gentry, Machesney Park, IL (US); William F. Nordlin, Poplar Grove, IL (US)

(73) Assignee: Greenlee Textron Inc., Rockford, IL (US)

( * ) Notice: Subject to any disclaimer, the term of this patent is extended or adjusted under 35 U.S.C. 154(b) by 944 days.

(21) Appl. No.: 11/969,622

(22) Filed: Jan. 4, 2008

(65) Prior Publication Data

US 2008/0166195 A1 Jul. 10, 2008

Related U.S. Application Data

(60) Provisional application No. 60/878,846, filed on Jan. 5, 2007.

(51) Int. Cl.
*B23B 51/02* (2006.01)

(52) U.S. Cl. ........................................ 408/224; 76/108.6

(58) Field of Classification Search .......... 408/223–225, 408/227, 230; 76/101.1, 108.1, 108.6, 115; B23B 51/00, 51/02
See application file for complete search history.

(56) References Cited

U.S. PATENT DOCUMENTS

| | | | |
|---|---|---|---|
| 2,276,532 A * | 3/1942 | Welty | 408/224 |
| 2,555,746 A * | 6/1951 | Horsky et al. | 408/59 |
| 2,897,696 A | 8/1959 | Tisserant | |
| 3,564,945 A | 2/1971 | Bradley | |
| 3,758,222 A | 9/1973 | Oakes | |
| 4,127,355 A | 11/1978 | Oakes | |
| 2007/0264094 A1 * | 11/2007 | Seeley | 408/224 |

FOREIGN PATENT DOCUMENTS

| | | |
|---|---|---|
| DE | 810912 | 6/1951 |
| DE | 19526686 A1 * | 3/1996 |
| DE | 29703475 U1 * | 6/1997 |
| DE | 29803261 U1 * | 4/1998 |
| EP | 1537932 A1 * | 6/2005 |
| FR | 725505 | 2/1932 |
| FR | 1080865 A * | 12/1954 |
| FR | 1080965 | 12/1954 |
| GB | 123605 | 3/1919 |
| JP | 63016912 A * | 1/1988 |
| JP | 07156007 A * | 6/1995 |

* cited by examiner

*Primary Examiner* — Daniel Howell
(74) *Attorney, Agent, or Firm* — Clark Hill PLC

(57) ABSTRACT

A spiral drill bit for forming holes of a variety of sizes has a main body which provides first and second helical grooves. First and second flutes extend along the length of the main body to provide first and second helical groove segments. Cutting segments are provided between the helical groove segments. The method for forming the spiral drill bit includes turning the helical groove segments onto a round stock. An axial clearance and an initial diametral clearance are provided upon turning the helical grooves. A grinding process is used to form a radial clearance and a final diametral clearance. The reduction to the amount of grinding required to form the spiral drill bit results in a reduction to the cost of production and a reduction in the time necessary to produce the spiral drill bit.

21 Claims, 8 Drawing Sheets

SPIRAL DRILL BIT AND METHOD OF FORMING SAME

This application claims the domestic benefit of U.S. Provisional Application Ser. No. 60/878,846 filed on Jan. 5, 2007, which disclosure is hereby incorporated by reference.

FIELD OF THE INVENTION

This invention is generally directed to a spiral drill bit for forming holes having different diameters and the method for forming the spiral drill bit.

BACKGROUND OF THE INVENTION

For a number of years, step drill bits have been commonly used, for example in the electrical industry, for cutting holes in panels made of sheet metal. One of the advantages that these step bits provide is that they can be used to cut a variety of holes of different diameters without requiring different drill bits to be mounted to and dismounted from a chuck of a powered tool. This, of course, saves time and money in the field.

A conventional step drill bit 10 is shown in FIGS. 1-4. For the purposes of reference and ease of discussion, the end 12 of the drill bit 10 which first contacts the workpiece will be referred to as the front, tip or forward end of the drill bit 10 and the end 14 of the drill bit 10 which is received by the chuck of the tool will be referred to as the back or rear, or rearward end of the drill bit 10. A central axis 16, about which the step drill bit 10 rotates, extends from the front end 12 to the rear end 14 of the drill bit 10.

A main body 18 of the step drill bit 10 is generally conically-shaped and extends from the tip 12 to a rear wall 20. A series of alternating cutting surfaces 22 and transition surfaces 24 are provided along the length of the main body 18. Each of the cutting surfaces 22 is generally cylindrically-shaped and has a lip or cutting edge 31 which is capable of cutting a hole of a predetermined diameter and a forward edge 33 along the circumference of the cutting surface 22. In the rearward direction, the diameter of each cutting surface 22 at the forward edge 33 increases relative to the diameter of the previous cutting surface 22 at the forward edge 33.

As best shown in FIG. 2, two diametrically-opposed flutes 26 are provided in the main body 18 of the step drill bit 10. Each flute 26 extends from the tip 12 to the rear wall 20 of the main body 18. The flutes 26 define first and second sections 28, 30 of the main body 18 extending from the tip 12 to the rear wall 20 of the main body 18. Each flute 26 intersects each cutting surface 22 so as to form two cutting segments 22a, 22b from each cutting surface 22.

In order to properly cut a hole, reliefs are required between the drill bit 10 and the workpiece to be cut. More specifically, reliefs are required between the cutting surfaces 22 of the drill bit 18 and the workpiece. These reliefs include axial relief, diametral relief and radial relief. FIGS. 1 and 2 demonstrate each of the reliefs incorporated into the step drill bit 10. As shown in FIG. 1, an axial relief A provides clearance along the axis 16 for the cutting surface 22 of the step drill bit 10 as the drill bit 10 is rotated. The axial relief A is defined by the angle between a plane perpendicular to the axis 16 and the forward edge 33 of the cutting surface 22. As shown, a minimum axial relief of 1° is provided. A diametral relief B is shown in FIG. 1 which provides clearance behind forward edges 33 of the cutting surfaces 22 of the step drill bit 10. The diametral relief B is defined by an angle between a line parallel to the axis 16 and a line tangent to the cutting surfaces 22. Thus, as the step drill bit 10 moves forward into the workpiece, the forward edge 33 of the cutting surface 22 contacts the workpiece. Immediately behind the forward edge 33, the diameter of the step drill bit 10 is reduced to ease the forward movement of the step drill bit 10 further into the workpiece. As shown, a diametral relief B of 0.5° is provided. FIG. 2 demonstrates the radial relief C provided by the step drill bit 10. As noted, each cutting surface 22 is divided in two segments 22a, 22b by the flutes 26. Each segment includes a leading edge 31 and a trailing edge 32. Along each segment 22a, 22b, the radius of step drill bit 10 decreases such that the radius of the drill bit 10 at the cutting edge 31 is larger than the radius of the drill bit at the trailing edge 32. Thus, the radial relief C is provided by the difference in the radius of the cutting surface proximate the cutting edge 31 and the radius of the cutting surface proximate the trailing edge 32. This radial relief C eases the rotation of the step drill bit 10 within the workpiece. As shown, the radial clearance C is 0.009 in/in.

Commonly, step drill bits, such as the one shown in FIGS. 1-3, are formed by first turning the general profile of the step bit and then grinding the necessary axial, diametral, and radial clearances A, B, C. A disadvantage of this technique is that a considerable amount of force is necessary to grind all three types of clearances onto the step drill bit. As a result, the grinding time necessary to make the step drill bit is relatively long and is therefore costly.

Another disadvantage is that it is difficult to grind multiple cutting surfaces 22 on the first section 28 of the main body 18 without damaging cutting surfaces 22 on the second section 30 of the main body 18. Grinding of each section 28, 30 is preformed by rotating a grinding wheel proximate the perimeter of the step drill bit 10 to shape the step drill bit 10, along with the desired clearances. In order to grind the perimeter of the step drill bit 10, the step drill bit 10 is rotated relative to the grinding wheel. Because the diameters of the cutting surfaces 22 proximate the tip 12 are smaller than the diameter of the cutting surfaces 22 proximate the rear wall 20, grinding of the cutting segments 22a of the first section 28 proximate the tip 12 will be completed prior to grinding of the cutting segments 22a of the first section 28 proximate the rear wall 20. In order to complete grinding of the segments 22a proximate the rear wall 20, rotation of the step drill bit 10 relative to the grinding wheel must continue. As a result, cutting segments 22b of the second section 30 come close to the grinding wheel and in some instances the grinding wheel inadvertently "nicks" cutting segments 22b on the second section 30 of the step drill bit 10. FIG. 3 illustrates "nicks" 36 on the cutting surfaces 22 of the second segments 22b of the step drill bit 10.

Accordingly, there exists a need to improve the method of manufacturing drill bits so that they can be made more time and cost efficiently, while still providing the necessary clearances on the drill bit so that it can cut effectively. The present invention provides a spiral drill bit which overcomes the problems presented in the prior art and which provides additional advantages over the prior art, such advantages will become clear upon a reading of the attached specification in combination with a study of the drawings.

SUMMARY OF THE INVENTION

Briefly, the present invention discloses a spiral drill bit which provides a plurality of cutting surfaces with different diameters and therefore allows holes of varying sizes to be cut with the spiral drill bit. Proper radial, axial and diametral clearances are provided for effective cutting of the workpiece. The process for forming the spiral drill bit minimizes the amount of grinding required to form the spiral drill bit and therefore reduces the time and cost of forming the spiral drill bit.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
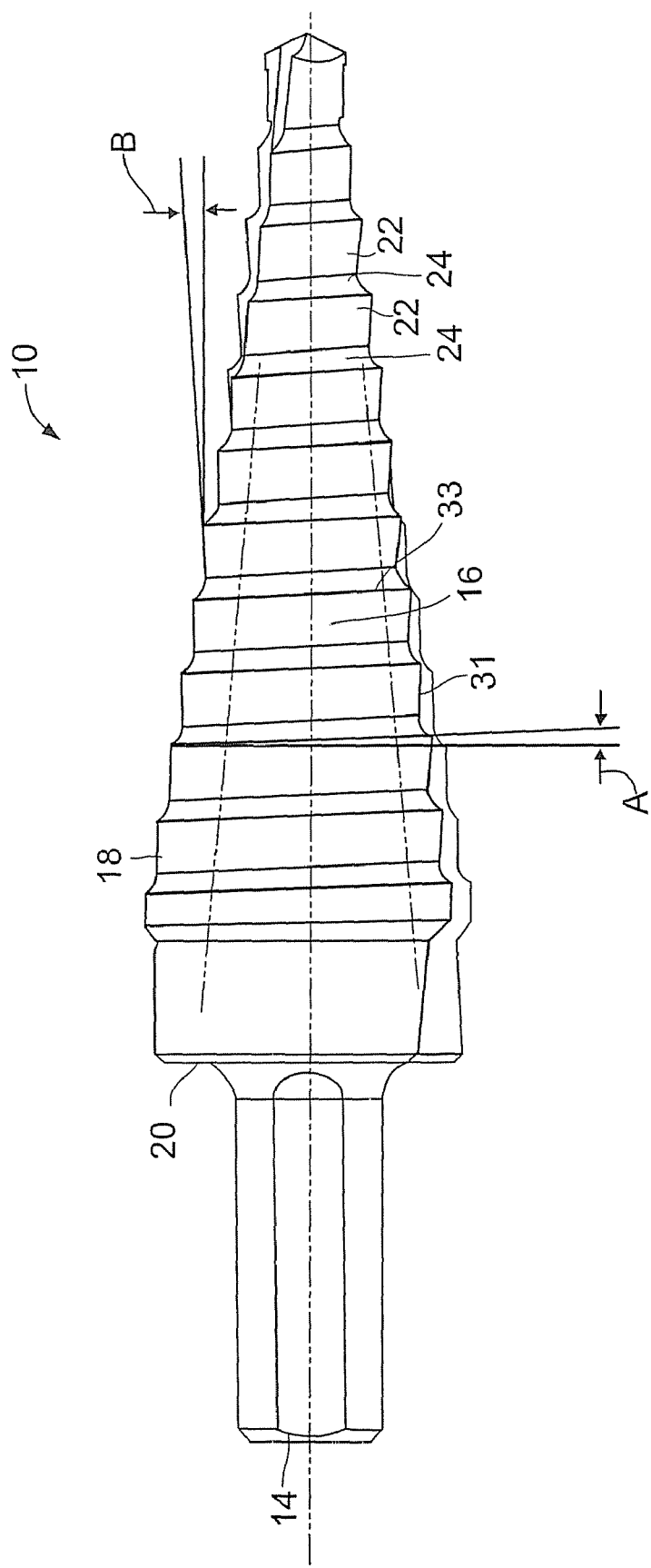
FIG. 1 is a side elevational view of a prior art step drill bit which illustrates the definition of axial and diametral reliefs.
Figure 2:
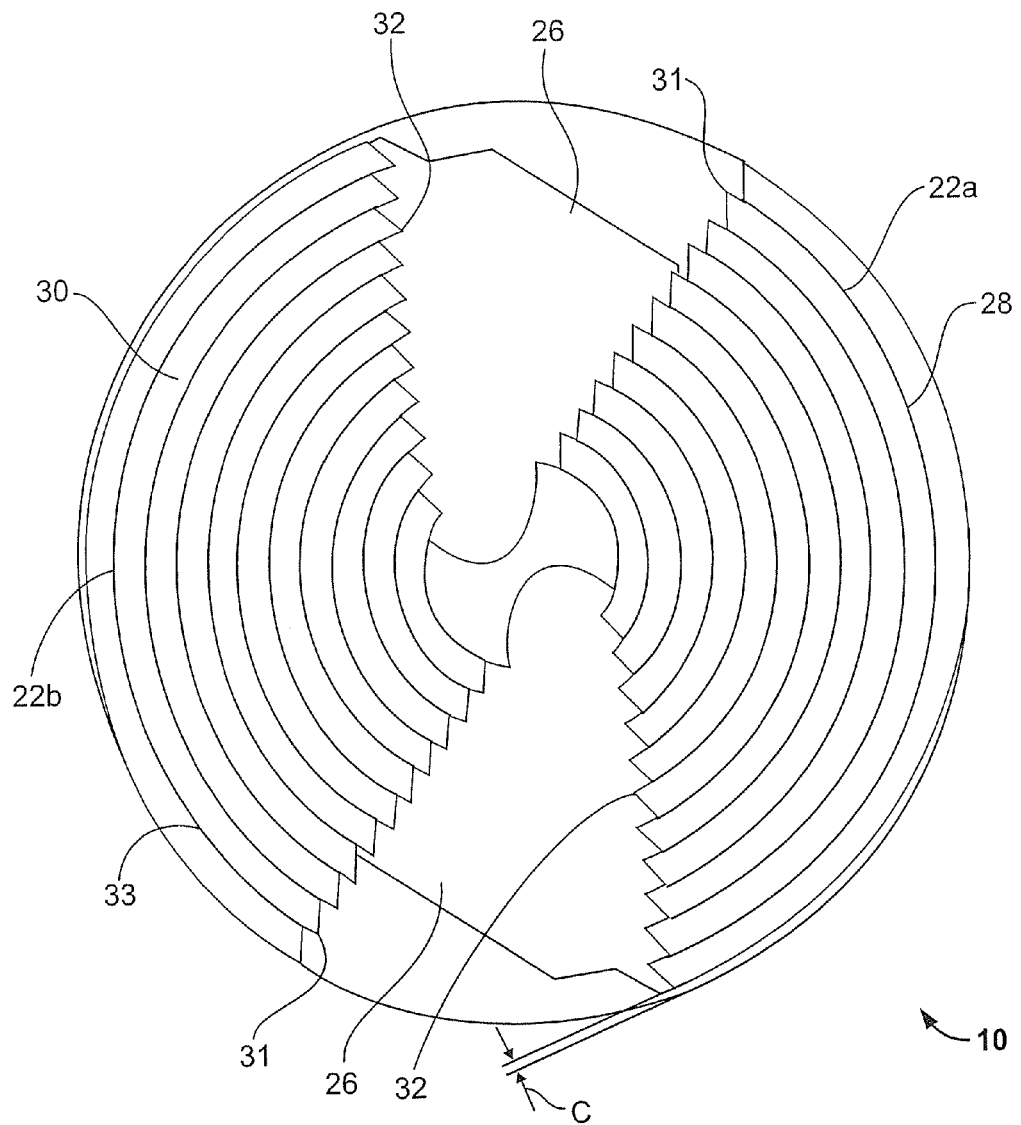
FIG. 2 is an elevational end view of the prior art step drill bit which illustrates the definition of radial relief.
Figure 3:
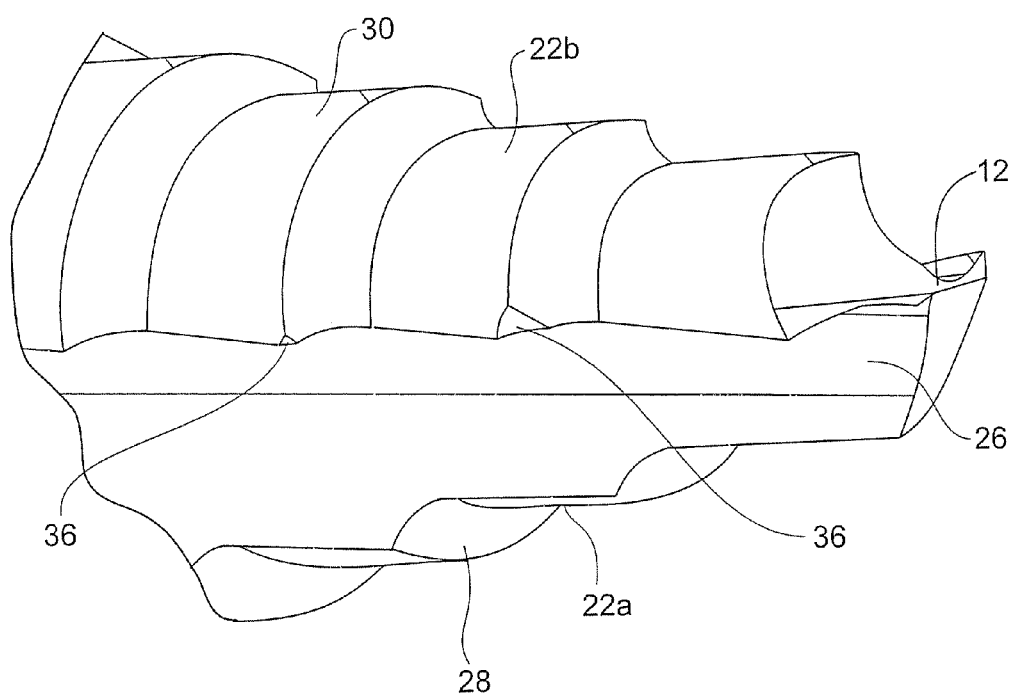
FIG. 3 is an enlarged perspective view of a portion of the prior art step drill bit in which some of the cutting edges are nicked.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 4:
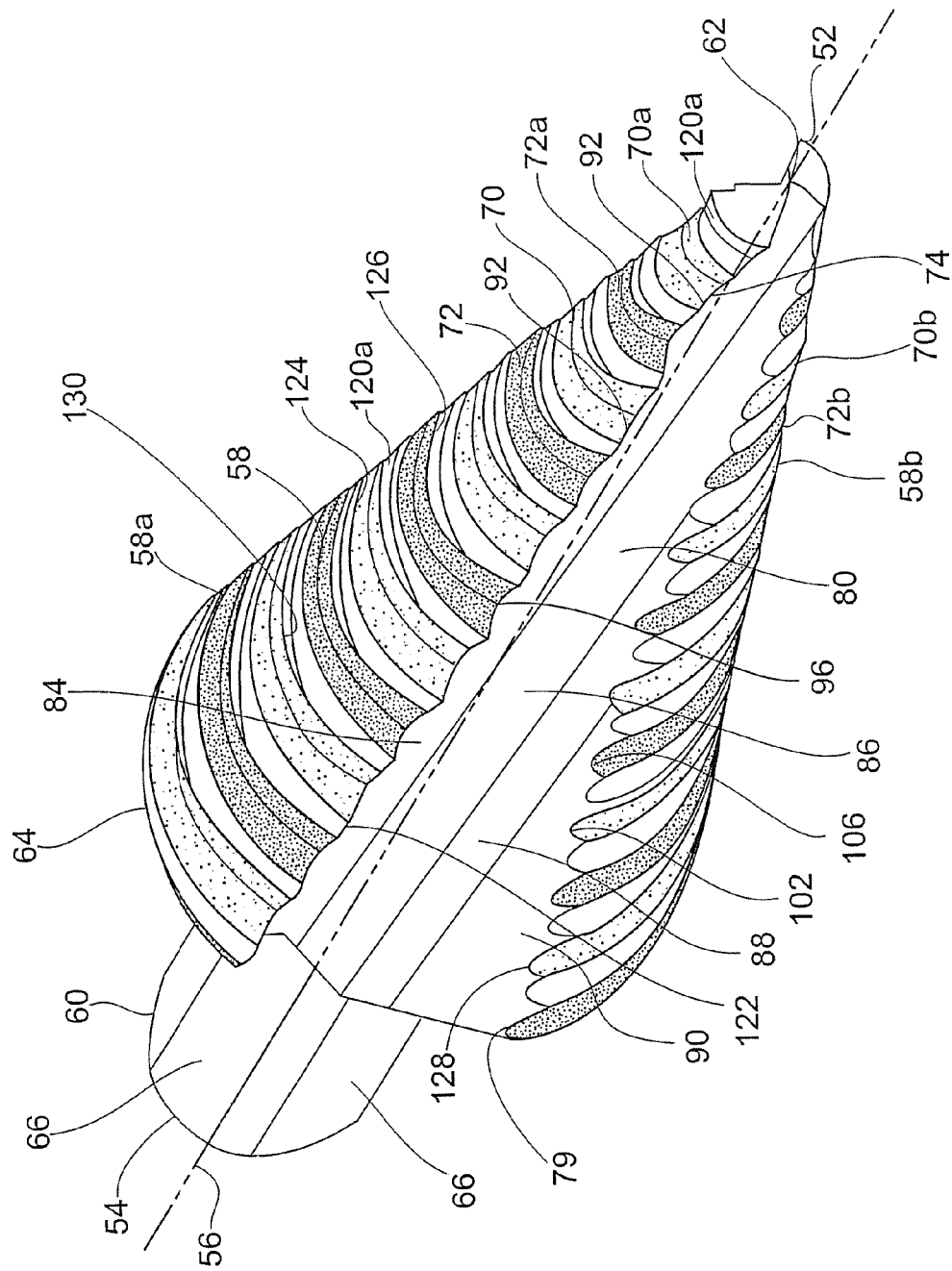
FIG. 4 is a perspective view of the spiral drill bit which incorporates features of the present invention which incorporates shading to designate features of the invention.
Figure 5:
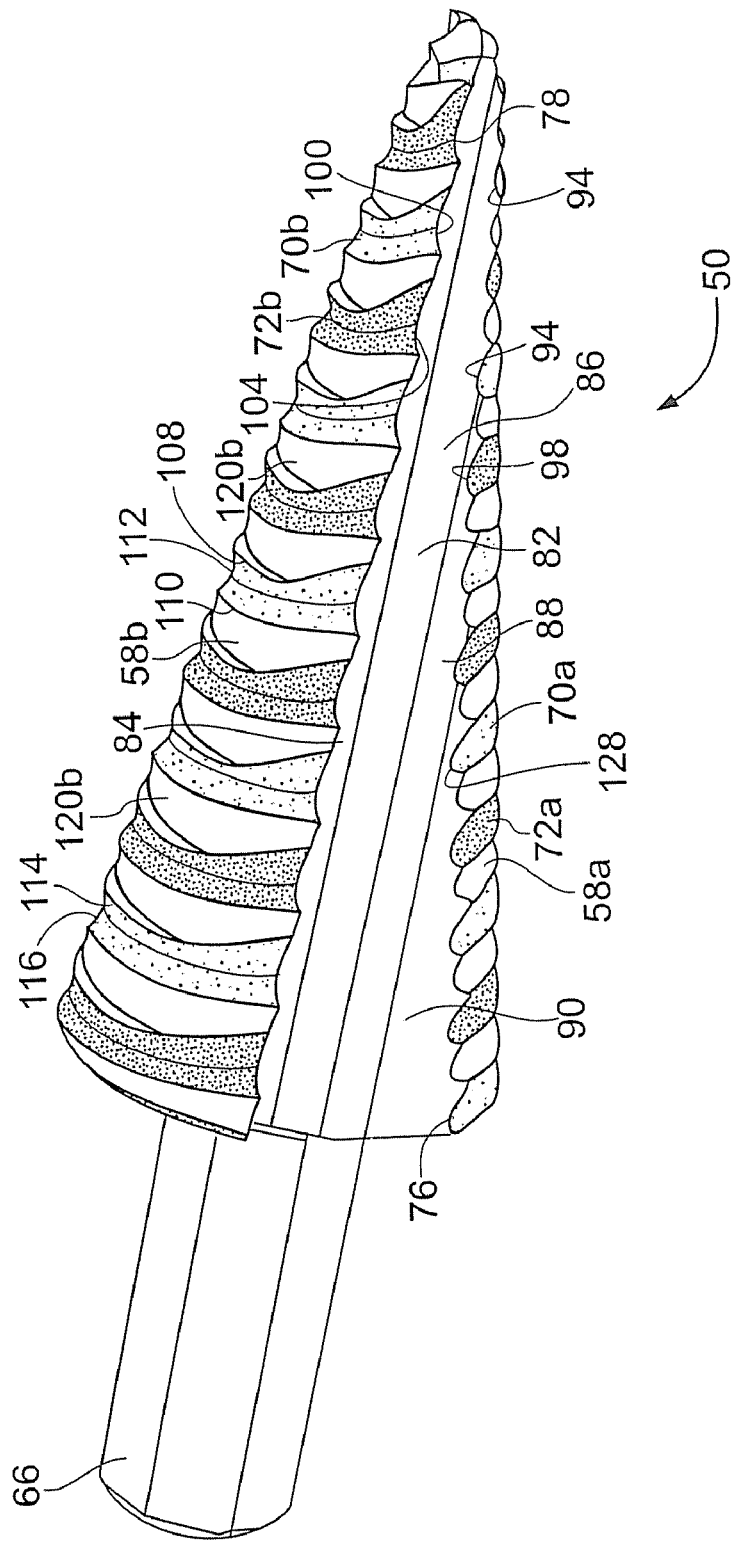
FIG. 5 is an alternative perspective view of the spiral drill bit which incorporates shading to designate features of the invention.

As best illustrated in FIGS. 4 and 5, a spiral drill bit 50 includes a generally conically-shaped main body 58 extending from a tip 62 at a front end 52 to a rear wall 64, and a shank 60 extending from the rear wall 64 of the main body 58. The tip 62 provides a split drill point. The end of the shank 60 defines a rear end 54. A central axis 56 extends from the front end 52 to the rear end 54. The rear wall 64 is perpendicular to the central axis 56. Flats 66 are provided on the shank 60 and provide driving surfaces for rotation of the spiral drill bit 50 when mounted within the chuck of an associated power tool (not shown). The main body 58 has first and second helical grooves 70, 72 separated by cutting segments 120*a*, 120*b*.

The first helical groove 70 includes a first end 74 proximate the tip 62 and a second end 76 proximate the rear wall 64. The second helical groove 72 includes a first end 78 proximate the tip 62 and a second end 79 proximate the rear wall 64. The first and second helical grooves 70, 72 are similarly formed and are spaced apart by a phase angle of one hundred eight degrees (180°). Each helical groove 70, 72 provides multiple turns about the central axis 56. To aid in understanding the invention, FIGS. 4 and 5 include shading to distinguish the first and second helical grooves 70, 72. The first helical groove 70 is designated with sparse shading and the second helical groove 72 is designated with dense shading.

Two diametrically-opposed first and second flutes 80, 82 extend from the tip 62 to the rear wall 64. Each flute 80, 82 is generally triangularly-shaped and includes a leading surface 84, a first inclined surface 86, a second inclined surface 88 and a back clearance 90. The flutes 80, 82 aid in the removal of debris from the drill bit 50 when in use, and the back clearances 90 provide additional back clearance as will be described herein. Although the flutes 80, 82 have been described as generally triangularly shaped, it is to be understood that the flutes of a variety of shapes could be provided. For example, the flutes 80, 82 could be U-shaped.

Each flute 80, 82 intersects the main body 58 to provide diametrically-opposite first and second main body portions 58*a*, 58*b*. Each flute 80, 82 intersects the first and second helical grooves 70, 72 to provide first helical groove segments 70*a* and second helical groove segments 72*a* on the first main body portion 58*a*, and first helical groove segments 70*b* and second helical groove segments 72*b* on the second main body portion 58*b*.

On the first main body portion 58*a*, the first helical groove segments 70*a*, the second helical groove segments 72*a* and the cutting segments 120*a* are provided in a pattern as follows: cutting segment 120*a*, then first helical groove segment 70*a*, then cutting segment 120*a*, then second helical groove segment 72*a* which repeats this pattern along the length of the main body 58. Each first helical groove segment 70*a* includes a leading end 92 and a trailing end 94. Each second helical groove segment includes a leading end 96 and a trailing end 98. The leading ends 92, 96 of the segments 70*a*, 72*a* are aligned along an edge of the leading surface 84 of the first flute 80, and the trailing ends 94, 98 are aligned along the second flute 82. The leading ends 92, 96 of the segments 70*a*, 72*a*, join with the that leading surface 84 of the flute 80 at an angle of ninety degrees (90°). The helical groove segments 70*a*, 72*a* of the first portion 58*a* of the main body 58 provide a radial clearance of 0.009 in/in. Thus, the radius of each groove segment 70*a*, 72*a* at the trailing ends 94, 98 is less than the radius of each groove segment 70*a*, 72*a* at the leading ends 92, 96 thereof.

On the second main body portion 58*b*, the first helical groove segments 70*b*, the second helical groove segments 72*b* and the cutting segments 120*b* are provided in a pattern as follows: cutting segment 120*b*, then first helical groove segment 70*b*, then cutting segment 120*b*, then second helical groove segment 72*b* which repeats this pattern along the length of the main body 58. Each first helical groove segment 70*b* includes a leading end 100 and a trailing end 102. Each second helical groove segment 72*b* includes a leading end 104 and a trailing end 106. The leading ends 100, 104 segments 70*b*, 72*b* are aligned along an edge of the leading surface 84 of the second flute 82 and the trailing ends 102, 106 of the segments 70*b*, 72*b* are aligned along the first flute 80. The leading ends 100, 104 of the segments 70*b*, 72*b* join with the leading surface 84 of the flute 82 at an angle of ninety degrees (90°). The helical groove segments 70*b*, 72*b* of the second portion 58*b* of the main body 58 provide a radial clearance of 0.009 in/in. Thus, the radius of each groove segment 70*b*, 72*b* at the trailing ends 102, 106 is less than the radius of each groove segment 70*b*, 72*b* at the leading ends 100, 104 thereof.

As best shown in FIG. 4, the trailing ends 102, 106 of the segments 70b, 72b are spaced from the leading end 92, 96 of the segments 70a, 72a by the first flute 80. As best shown in FIG. 5, the trailing ends 94, 98 of segments 70a, 72a are spaced from the leading ends 100, 104 of the segments 70b, 72b by the second flute 82.

Figure 6:
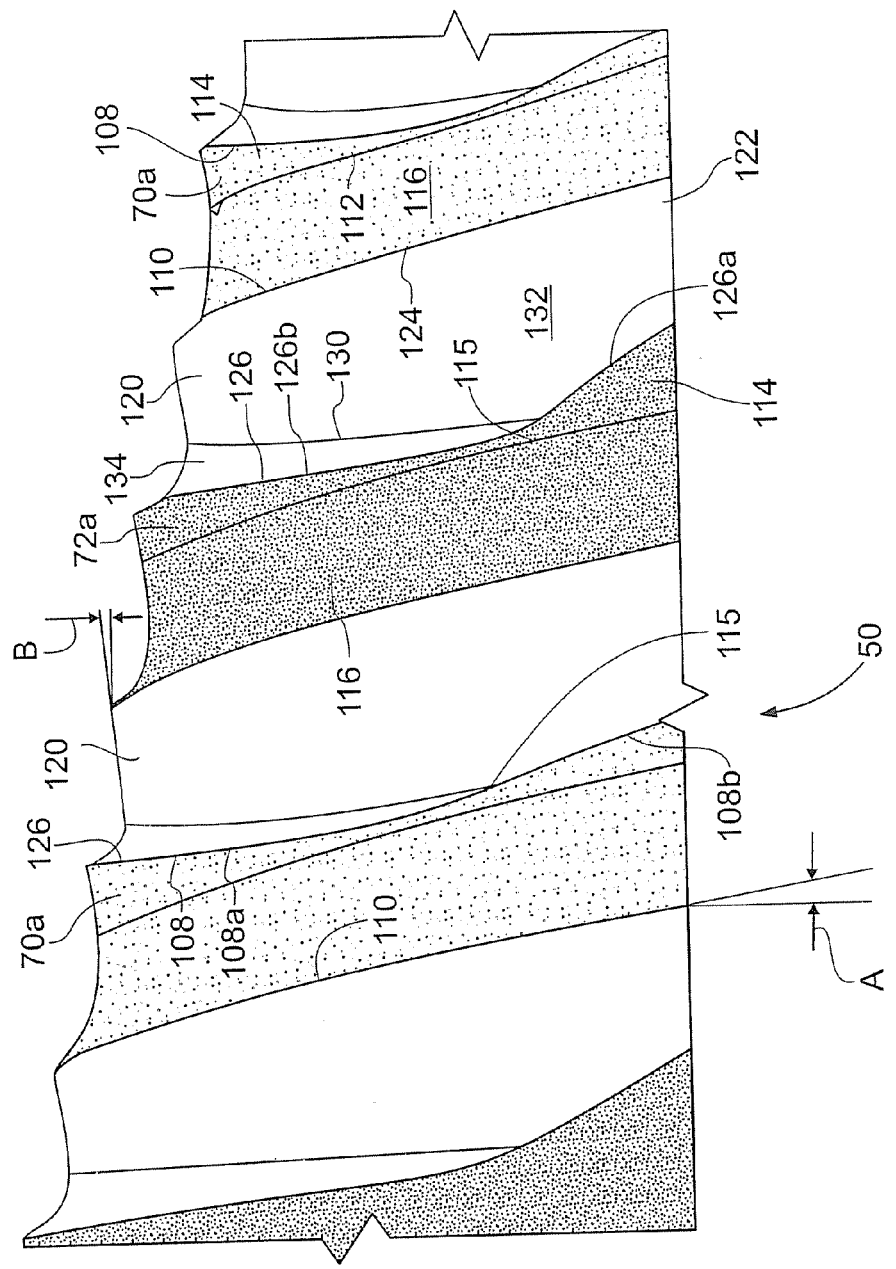
FIG. 6 is an enlarged elevated view of a portion of the spiral drill bit.

The helical groove segments 70a, 72a, 70b, 72b are similarly shaped. As best shown in FIG. 6, each helical groove segment 70a, 72a, 70b, 72b includes a forward edge 108, a rearward edge 110 and a trough 112. The forward edge 108, rearward edge 110 and trough 112 of each helical groove segment 70a, 72a 70b, 72b extend along the circumference of the spiral drill bit 50 between the first and second flutes 80, 82. The forward edge 108 includes a first portion 108a and a second portion 108b. The first portion 108a is generally parallel to the rearward edge 110 and the second portion 108b is angled relative to the rearward edge 110. A forward surface 114 extends from the forward edge 108 to the trough 110. In the rearward direction, the forward surface 114 slopes inwardly relative to the central axis 56. The width of each forward surface 114 is greater at the leading ends 92, 96, 100, 104 and trailing ends 94, 98, 102, 106 than at a location 115 spaced from these ends. A rear surface 116 extends from the rearward edge 110 to the trough 112. In the rearward direction, the rearward surface 116 slopes outwardly relative to the central axis 56.

Each cutting segment 120a is provided forward and distal of each helical groove segment 70a, 72a of the first main body portion 58a. Each cutting segment 120b is provided forward and distal of each helical groove segment 70b, 72b of the second main body portion 58b. In the rearward direction, the diameter of each cutting segment 120a, 120b is larger than the diameter of the previous cutting segment 120a, 120b.

The cutting segments 120a, 120b are similarly shaped. Each cutting segment 120a, 120b extends between the first and second flutes 80, 82. As best shown in FIG. 6, each cutting segment 120a includes a leading edge 122, a forward edge 124, a rearward edge 126, a trailing edge 128 (see FIG. 5), and a trough 130.

As best shown in FIG. 4, the leading edges 122 of the cutting segments 120a are aligned along the leading surface 84 of the flute 80. The forward edge 124 of each cutting surface 120a extends from the first flute 80 to the second flute 82, and the rearward edge 126 extends from the first flute 80 to the second flute 82. The forward edge 124 is aligned with the rearward edge 110 of the helical groove segment 70a or 72a immediately forward of the cutting segment 120a. The rearward edge 126 includes a first portion 126a and a second portion 126b. The first portion 126a is angled relative to the forward edge 124 and the second portion 126b is generally parallel to the forward edge 124. The rearward edge 126 is aligned with the forward edge 108 of the helical groove segment 70a, or 72a immediately rearward of the cutting segment 120a. The trough 130 extends from the second portion 126a of the rearward edge 126 to the second flute 82. A forward surface 132 is defined by the forward edge 124, the first portion 126a of the rearward edge 126, and the trough 130. A rearward surface 134 is defined by the trough 130, the first portion 126a of the rearward edge 126, the second portion 126b of the rearward edge 126 and the flute 82.

As best shown in FIG. 4, the leading edges 122 of the cutting segments 120b are aligned along the leading surface 84 of the flute 82. The forward edge 124 of each cutting surface 120b extends from the first flute 80 to the second flute 82, and the rearward edge 126 extends from the first flute 80 to the second flute 82. The forward edge 124 is aligned with the rearward edge 110 of the helical groove segment 70b or 72b immediately forward of the cutting segment 120b. The rearward edge 126 includes a first portion 126a and a second portion 126b. The first portion 126a is angled relative to the forward edge 124 and the second portion 126b is generally parallel to the forward edge 124. The rearward edge 126 is aligned with the forward edge 108 of the helical groove segment 70b, or 72b immediately rearward of the cutting segment 120b. The trough 130 extends from the second portion 126a of the rearward edge 126 to the second flute 82. A forward surface 132 is defined by the forward edge 124, the first portion 126a of the rearward edge 126, and the trough 130. A rearward surface 134 is defined by the trough 130, the first portion 126a of the rearward edge 126, the second portion 126b of the rearward edge 126 and the flute 82.

The forward surface 132 and the rearward surface 134 of the cutting segments 120a, 120b are arranged to provide a diametral clearance B of 0.5°. The forward edge 124 of the cutting segments 120a, 120b provides a minimal axial clearance A of 1°.

In operation, the spiral drill bit 50 is mounted into the chuck of an associated power tool. When the spiral drill bit 50 is placed in contact with the workpiece and rotated, the tip 62 initially forms a small hole in the workpiece. As rotation of the spiral drill bit 50 continues, and as the spiral drill bit 50 is advanced into the workpiece, the forwardmost cutting segments 120a, 120b contact the workpiece to increase the diameter of the hole formed in the workpiece. The leading and forward edges 122, 124 of the cutting segments 120a, 120b initially contact the workpiece to increase the diameter of the hole previously formed by the tip 62 forming a hole having a diameter approximately equivalent to the diameter of the spiral drill bit 50 at the cutting segments 120a, 120b. Rotation of the cutting segments 120a, 120b through the workpiece is improved by the radial relief C provided on each cutting segment 120a, 120b. Advancement of the spiral drill bit 50 through the workpiece is improved by the diametral relief B of approximately 0.5°. Workpiece debris from the cutting site travels to the rear of the spiral drill bit 50 via the flutes 80, 82 and additional back clearance areas 90.

If a hole of greater diameter is desired, the user continues to advance the spiral drill bit 50 through the workpiece. As the user advances the spiral drill bit 50 further into the workpiece, the next helical groove segments 70a, 72a, 70b, 72b pass through the workpiece, until the next cutting segment is reached. When the cutting segments 120a, 120b contact the workpiece, the leading and forward 122, 124 edges of the cutting segments 120a, 120b again cut the workpiece to increase the diameter of the hole which continues to be cut. Each cutting segment 120a, 120b within the first and second series of cutting segments 120a, 120b provides a radial relief C of approximately 0.009 in/in and a diametral relief B of 0.5° to assist rotational and forward advancement of the spiral drill bit 50 through the workpiece.

Figure 7:
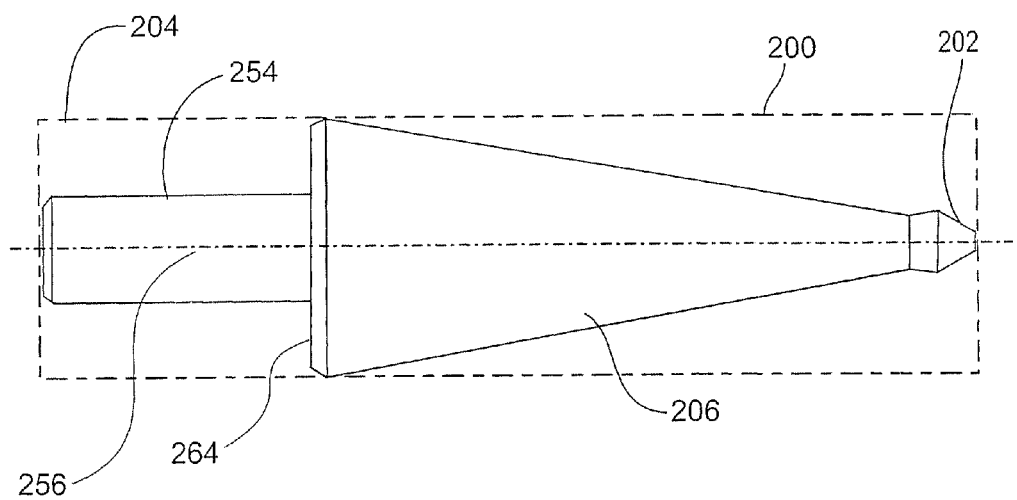
FIG. 7 is a side elevational view of bit at a preliminary processing stage and phantom lines illustrating the shape of the stock from which the material was formed.

The process for forming the spiral drill bit 50 will now be described. Formation of the spiral drill bit 50 begins with a cylindrically-shaped piece of round stock. The round stock used to form the spiral drill bit is preferably unhardened M7. The shape of the initial round stock is represented by the dashed lines 200 in FIG. 7. The round stock 200 is preferably mounted oil a multitasking lathe (not shown) where it is turned to form the tip 202. The rear end 204 of the round stock 200 is then secured by chucking onto its outer diameter and nesting the tip 202 within a female center located at the tail stock of the lathe. Mounting of the stock 200 in this manner ensures that the stock 200 is properly secured and supported during the turning operation. Next, the conically-shaped main body 206 of the spiral drill bit 50 is finish turned by the multitasking lathe.

Once the conically-shaped main body 206 has been formed, the helical grooves 270, 272 are turned onto the spiral drill bit 50 using two form tools (not shown). The helical grooves 270, 272 begin at diametrically-opposed positions and are off set by a phase angle of 180 degrees (180°). Each form tool is controlled by a separate turret of the multitasking lathe. Preferably, the grooves 270, 272 are cut simultaneously. Simultaneous cutting of the grooves 270, 272 serves to trap the spiral drill bit 50 between the form tools to prevent shifting of the spiral drill bit 50. The threading canned cycle of the multitasking lathe could be used to form the grooves 270, 272 by following a tapered helix such that the diameter of the helical grooves 270, 272 increases as they progress further away from the tip 202 of the spiral drill bit 50. Each helical groove 270, 272 includes a forward edge 209 and a rearward edge 211. The forward edge 209 of the first helical groove 270 contacts the rearward edge 211 of the second helical groove 272 and the forward edge 209 of the second helical groove 272 contacts the rearward edge 211 of the first helical groove 270.

Figure 8:
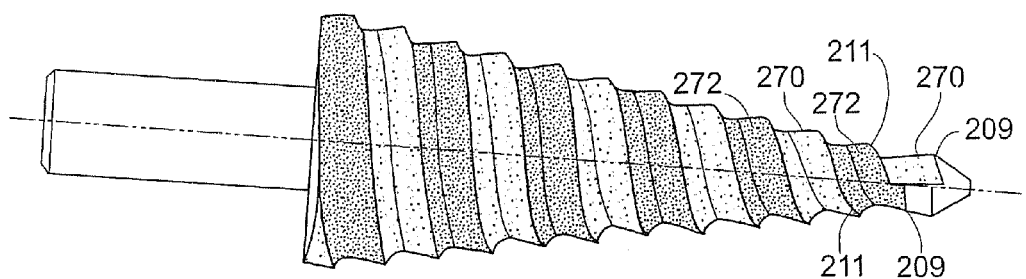
FIG. 8 is a side elevational view of the bit of FIG. 7 with two tapered helical grooves turned into the periphery of the bit.

Upon cutting the grooves 270, 272, the diametral relief B provided is approximately eight degrees (8°). In addition, upon cutting the grooves 270, 272, an axial relief A is also provided. Although the axial relief A varies depending upon the location along the helix, the axial clearance A is at minimum one degree (1°). The turned helical grooves 270, 272 are shown in FIG. 8. Finally, the shank 254 is back turned by the multitasking lathe.

Figure 9:
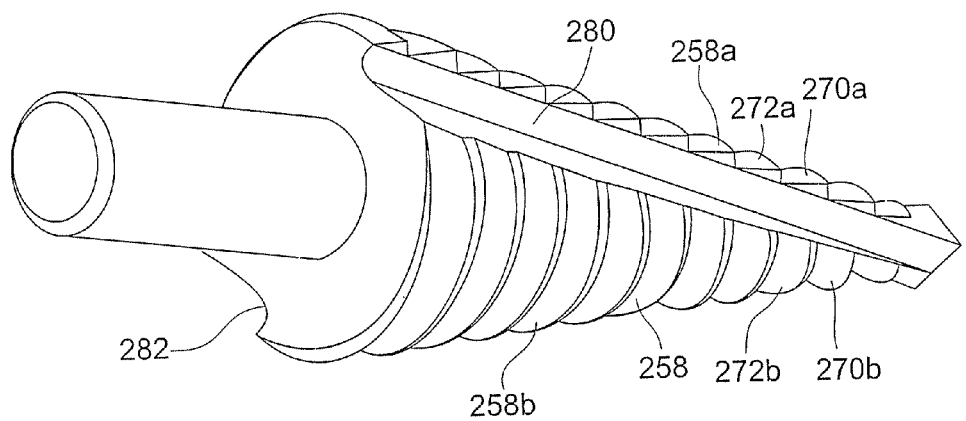
FIG. 9 is a perspective view of the bit shown in FIG. 8 with flutes milled therein.

Next, milling operations are performed on the spiral drill bit 50. The flutes 280, 282 as shown in FIG. 9, are milled on the body portion 258 of the spiral drill bit 50 forming the first and second main body portions 258a, 258b and defining the first segments 270a, 272a of the first groove 270 and the second segments 270b, 272b of the second groove 272. The additional back clearances 90 (shown in FIGS. 4 and 5) are also milled on the body portion 258 and the flats 66 (shown in FIGS. 4 and 5) are milled onto the shank 254.

After milling, the spiral drill bit 50 is cut off the round stock 200 preferably using the multitasking lathe, and the spiral drill bit 50 is heat treated.

Figure 10:
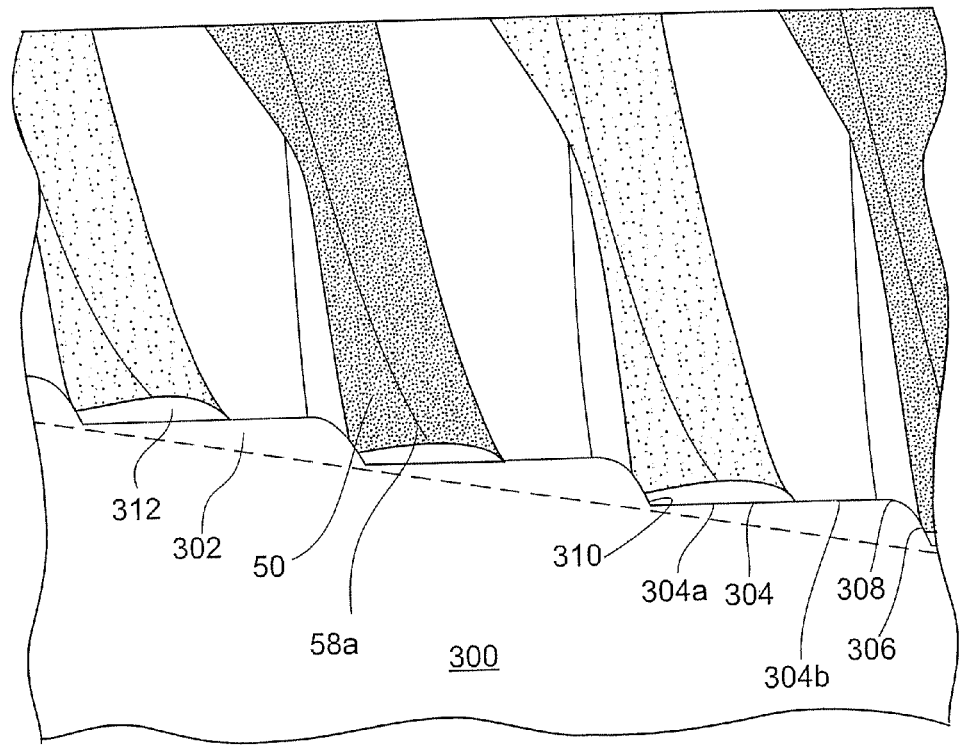
FIG. 10, is an enlarged side elevational view of portion of the spiral drill bit of FIG. 9 with cutting segments ground thereon, shown proximate a grinding wheel used to form the cutting segments.

Once the spiral drill bit 50 is heat treated, it is ready for grinding for formation of the final geometry of the spiral drill bit 50. The surface of the spiral drill bit 50 is ground by placing the spiral drill bit 50 against a grinding wheel 300 as shown in FIG. 10. The grinding wheel 200 extends proximate the tip 202 of the spiral drill bit to the rear wall 264 of the spiral drill bit 50. The perimeter of the grinding wheel 300 provides a series of shoulders 302. Each shoulder 302 includes a rearwardly directed surface 304 and an outwardly directed surface 306 extending from the rearwardly directed surface 304. The rearwardly directed surface 304 generally includes a forward portion 304a and a rearward portion 304b. As shown in FIG. 10, the forward portion 304a does not contact the spiral drill bit 50, but the rearward portion 304b contacts the spiral drill bit 50. A rounded corner 308 is provided at the junction between the rearwardly directed surface 304 and the outwardly directed surface 306. A rounded relief 310 is provided at the junction between the outwardly directed surface 306 of a first shoulder 302 and the rearwardly directed surface 304 of the next rearward shoulder 302.

The shoulders 302 of the grinding wheel 300 are placed in contact with the series of groove segments 270a, 272a provided along the first portion 258a of the spiral drill bit 50. More specifically, each shoulder 302 is aligned with spiral drill bit 50 such that each shoulder 302 contacts first and second helical groove segments 270a, 272a. As a result of the grinding process, the cutting segments 220a having leading edges 222 proximate the flute 280 and trailing edges proximate the second flute 282 are formed on the first main body portion 258a.

The final diametral clearance B of the spiral drill bit 50 is formed due to the profile of the grinding wheel 300. As noted earlier, the turned diametral clearance B of the spiral drill bit 50 is approximately eight degrees (8°) and as a result, the grinding wheel 300 does not contact every portion of the groove segments 270a, 272a. As shown in FIG. 14, a recess 312 is provided between the forward portion 304a of the rearwardly directed surface 304 and a portion of each helical groove segment 270a, 272a. Because the grinding wheel 300 does not contact every portion of the groove segments 270a, 272a, the power and time necessary to grind the cutting surfaces 220 of the spiral drill bit 50 is reduced, resulting in a more economical manufacturing process. Upon completion of the grinding step, a final diametral clearance B of 0.5° is provided by the cutting segments 220a.

The radial relief C is provided on the cutting segments 220 by varying the path of the grinding wheel 300, i.e. distance of the grinding wheel 300 relative to the axis 256 of the spiral drill bit 50. More specifically, as the cutting segments 220 are rotated relative to the grinding wheel 300, the distance between the axis 256 of spiral drill bit 50 and the profile of the grinding wheel 300 is decreased such that the distance is smaller at the trailing ends of the cutting segments 220 than at the leading ends of the cutting segments 220. The radial clearance provided as a result of the grinding process is 0.009 in/in.

The arrangement of the helical grooves 270, 272 along with the additional back clearance provided by the back clearances 90 of the flutes 80, 82 allow for simultaneous grinding of helical groove segments 270a, 272a on the first main body portion 258a while reducing the risk that the cutting edges of the helical groove segments 270b, 272b of the second main body portion 258b will be nicked.

Once the cutting segments 220a have been ground on main body portion 258a, the cutting segments 220b are ground on second main body portion 258b, in a similar manner.

A grinding operation is also used to form the split drill point on the tip 62 of the spiral drill bit 50. Preferably, the drill point is split by an additional grinding operation. The split drill point reduces the cutting force needed to begin forming a hole in the workpiece, and therefore maximizes the life of the spiral drill bit 50.

Preferably all grinding operations are performed without an additional set-up on the grinding wheel 300, to ensure that all features ground on the spiral drill bit 50 are properly oriented relative to each other.

The spiral drill bit 50 therefore provides the ability to cut holes having different diameters by advancing the spiral drill bit 50 through the workpiece. The spiral drill bit 50 provides proper axial, diametral, and radial clearances A, B, C for cutting the holes effectively. Due to the minimal amount of grinding necessary to form the spiral drill bit 50, the spiral drill bit 50 can be cost-efficiently manufactured.

The preferred method for manufacturing the spiral drill bit 50 has been described above. An alternative method could however be used. In this method the tip 202 is first turned and the round stock 200 is supported using a radial nest that is held in the lower turret of the multitasking lathe. Next, the conical portion of the spiral drill bit 50 is turned and the first and second grooves 270, 272 are formed separately by a form tool controlled by the upper turret while the stock is support by the radial nest. The flutes 280, 282 are then milled on the body portion 258 of the spiral drill bit. Next, the shank 254 is back turned and the flats 66 are milled onto the shank 254. Finally, the spiral drill bit 50 would be cut from the stock 200, heat treated and ground as previously described.

While a preferred embodiment of the present invention is shown and described, it is envisioned that those skilled in the art may devise various modifications of the present invention without departing from the spirit and scope of the appended claims.

The invention claimed is:

1. A drill bit for drilling holes of a plurality of diameters in a workpiece comprising:
   a generally conically-shaped main body including a tip, a rear wall, a central axis extending from said tip to said rear wall about which the drill bit is rotated, a first flute and a second flute each extending along a length of said main body, a first helical groove extending along said main body, said first helical groove including a plurality of first helical groove segments, a second helical groove extending along said main body, said second helical groove including a plurality of second helical groove segments, said first and second helical groove segments alternating along the length of said main body, and a cutting segment provided at least between adjacent ones of said first and second helical groove segments; and
   a shank extending rearwardly from said rear wall of said main body.

2. A drill bit as defined in claim 1, wherein said first and second helical grooves are offset by a phase angle of 180 degrees.

3. A drill bit as defined in claim 1, wherein each helical groove segment has a leading end and a trailing end, and wherein said leading ends are positioned along a first wall of said at least one flute.

4. A drill bit as defined in claim 1, wherein each cutting segment includes a leading edge and a trailing edge and wherein said leading edges of each cutting segment are aligned along a first wall of said at least one flute and a cutting surface of each said cutting segment extends from said leading edge to said trailing edge.

5. A drill bit as defined in claim 4, wherein each said cutting surface has a diametral relief.

6. A drill bit as defined in claim 5, wherein said diametral relief is approximately 0.5°.

7. A drill bit as defined in claim 4, wherein a cutting surface of said cutting segments includes a radial relief.

8. A drill bit as defined in claim 7, wherein said radial relief is approximately 0.009 in/in.

9. A drill bit as defined in claim 5, wherein a cutting surface of said cutting segments includes an axial relief.

10. A drill bit as defined in claim 9, wherein said axial relief is at least 1°.

11. A method of forming a spiral drill bit used for forming a plurality of diameters in a workpiece comprising the steps of:
    providing a generally cylindrically-shaped stock;
    turning a generally conically-shaped main body from said cylindrically-shaped stock;
    turning first and second helical grooves on said main body;
    milling a first flute and a second flute along the length of said main body thereby intersecting said first and second helical grooves to form groove segments; and
    grinding said main body to form cutting segments and wherein said cutting segments are provided between said groove segments.

12. The method as defined in claim 11, wherein said first and second helical grooves are offset by a phase angle of 180 degrees.

13. The method as defined in claim 12, wherein said first and second helical grooves are simultaneously turned.

14. The method as defined in claim 11, wherein the diametral clearance of said turned helical grooves is approximately eight degrees.

15. The method as defined in claim 11, wherein the axial clearance of said turned helical grooves is a minimum of one degree.

16. The method of claim 11, further including the step of turning said stock to form a tip at a front end of said stock prior to turning said main body.

17. The method of claim 11, further including the step of turning a shank rearward of said main body.

18. The method of claim 17, further including the step of milling flats on said shank.

19. The method of claim 11, further including the step of milling a back clearance proximate said at least one flute.

20. The method of claim 11, further including the step of cutting a remainder of said stock from said spiral drill bit.

21. A spiral drill bit made in accordance with the method of claim 11.

* * * * *